(12) United States Patent
Vergara

(10) Patent No.: US 6,918,865 B2
(45) Date of Patent: Jul. 19, 2005

(54) ROLL COVER

(75) Inventor: Romeo G. Vergara, Salisbury, NC (US)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 10/284,770

(22) Filed: Oct. 31, 2002

(65) Prior Publication Data

US 2004/0087423 A1 May 6, 2004

(51) Int. Cl.[7] .............................. F16C 13/00; B21K 1/02
(52) U.S. Cl. ......................... 492/56; 492/48; 29/895.3; 29/895.32
(58) Field of Search .......................... 29/895.32, 895.3; 492/56, 59, 48

(56) References Cited

U.S. PATENT DOCUMENTS

| | | | | |
|---|---|---|---|---|
| 4,775,501 A | * | 10/1988 | Rosenzweig et al. | 264/450 |
| 4,820,466 A | * | 4/1989 | Zachariades | 264/119 |
| 4,880,879 A | | 11/1989 | Bauman | 525/130 |
| 4,972,030 A | | 11/1990 | Bauman | 524/523 |
| 5,290,498 A | | 3/1994 | Shiraki et al. | 264/209.2 |
| 5,403,638 A | * | 4/1995 | Yanagizawa et al. | 428/90 |
| 5,887,517 A | | 3/1999 | Liang et al. | 100/327 |
| 6,187,867 B1 | | 2/2001 | Rau et al. | 525/221 |
| 6,305,859 B2 | * | 10/2001 | Shida | 400/636 |
| 6,328,681 B1 | | 12/2001 | Stephens | 492/56 |
| 2001/0012466 A1 | * | 8/2001 | Shida | 400/617 |

FOREIGN PATENT DOCUMENTS

| | | | | |
|---|---|---|---|---|
| CA | 1147133 | 5/1983 | | B21K/21/00 |
| JP | 62-56118 | 3/1987 | | B29C/63/42 |
| JP | 4-63862 | 2/1992 | | C08L/77/00 |
| JP | 4-63866 | 2/1992 | | C08L/81/02 |
| JP | 4-272839 | 9/1992 | | B32B/5/00 |
| JP | 5-16298 | 1/1993 | | B32B/27/06 |
| JP | 5-43743 | 2/1993 | | C08L/21/00 |
| JP | 9-309958 | 12/1997 | | C08J/5/10 |
| JP | 10-250870 | 9/1998 | | B65H/5/06 |
| WO | WO97/47460 | 12/1997 | | B29C/47/24 |
| WO | WO00/43593 | 7/2000 | | D21G/1/02 |

* cited by examiner

Primary Examiner—Marc Jimenez
(74) Attorney, Agent, or Firm—Taylor & Aust, P.C.

(57) ABSTRACT

A paper machine roll cover surface layer has a mixture of an elastomeric material and between about 10 phr and about 24 phr UHMWPE particles.

25 Claims, 1 Drawing Sheet

ROLL COVER

BACKGROUND OF THE INVENTION

1. Field of the Invention

The present invention pertains generally to industrial roll covers and, more particularly, to fillers provided in elastomeric roll covers used on paper machine rolls.

2. Description of the Related Art

Industrial rolls are used in many manufacturing processes, including steel mills, textile mills, and others. Paper machines in paper mills use a wide variety of different types of rolls in different environments for different purposes. Rolls on paper machine can be used for merely transporting the web from one location to another, or can be used in direct contact with the web or with paper machine clothing to treat the web, such as by pressing. The conditions under which paper machine rolls function can be quite harsh, including high temperatures and high pressures in the presence of corrosive chemicals. In addition, operating speeds are high, and ever increasing, and paper machine operation is substantially continuous.

It has been known to use steel roll shells or cores covered with different materials suitable for the particular location, operating conditions and roll performance requirements of the paper machine roll. Using a cover on the roll allows for quicker and less expensive reconditioning of the roll than replacing the entire roll. When a roll cover is damaged or worn, it can be reground easily, or stripped from the shell and replaced at lower cost than replacing the entire roll. By using different roll cover materials and formulations, the surface characteristics of the roll can be optimized for the location in the paper machine in which the roll is installed. Thus, desired and necessary hardness, abrasion and wear resistance, chemical resistance and other properties can be achieved. Both natural rubbers and synthetic elastomers have been used in paper machine roll covers. It also is known to use a plurality of different materials in layers between the roll shell and the top layer of the roll cover, as transition layers between the shell and the top layer, to promote roll cover life.

Efforts continue to make paper machines run faster, and to run for longer intervals between scheduled maintenance procedures. Chemicals used in the paper making process as conditioners, treatments and additives also are changing and improving. Thus, the demands on the performance of rolls and the covers on the rolls are also ever increasing. Synthetic fiber or particle fillers have been used mixed with the elastomer to improve paper machine roll performance, and to increase roll cover life.

It also is known to provide roll covers having a top layer made of a mixture of elastomeric material and ultra high molecular weight polyethylene (UHMWPE). According to one known composition range, the mixture includes about 100 parts elastomeric material by weight, and between about 25 and 50 parts UHMWPE by weight. Such roll covers may have a hardness between 10 to 50 P&J hardness scale.

While a roll cover comprising a mixture of an elastomer and UHMWPE as disclosed above has utility in paper machines for some paper making processes, and in some positions on the paper machine, it has certain shortcomings as well. A paper machine roll cover directly contacting the paper web must exhibit good sheet release properties. That is, the paper web, which may still contain a substantial amount of water and have minimal sheet strength, must release from the roll surface. If the web sticks or adheres to the roll surface, a web brake will occur, with the resultant waste of manufacturing time and product. Due to the large particle size of UHMWPE commonly used in rubber compounds, exposed particles on the cover surface limit the attainable surface smoothness, and thereby the sheet release properties of the roll cover. Adhesion between the elastomer matrix and the UHMWPE particles can be inconsistent, resulting in surface marking on the cover that translates to defects in the web being processed. Additionally, UHMWPE fibers and particles are expensive to obtain, thus substantially increasing the cost of the roll cover. Since paper machine roll covers commonly are re-ground with some frequency, and may require re-covering after a limited number of re-grindings, the additional cost from the use of UHMWPE fibers or particles can increase substantially the cost of operating a paper machine.

It also is known to provide roll covers comprising a polymeric material into which have been dispersed polyethylene particles that have been surface treated to alter the properties of the mixture. For example, U.S. Pat. No. 4,880,879, entitled "ABRASION RESISTANT COMPOSITE MATERIAL AND PROCESS FOR MAKING THE SAME", issued Nov. 14, 1989, discloses a material and a process for the material, having polyethylene particles in a thermoset polymeric matrix, the particles having been surface treated to enhance the bonding between the particles and the polymeric matrix. While the particles are called "high molecular weight polyethylene (HMW PE) particles", the molecular weight of the particles is said to be at least 1 million, and preferably in a range of 1 to 9 million. Thus, a roll cover made from such a mixture would suffer from the same disadvantages as the elastomeric-UHMWPE roll covers discussed above.

What is needed in the art is a paper machine roll cover that is economical to fabricate, is reliable when operated under adverse conditions, resists marking and damage, and can be ground to a high degree of smoothness.

SUMMARY OF THE INVENTION

The present invention provides an improved polyethylene filled elastomeric layer of a paper machine roll by reducing the amount of polyethylene particles used while retaining the desirable attributes of known compositions using more polyethylene particles.

The invention provides, in one form thereof, a surface layer for a paper machine roll cover having an elastomeric material; and UHMWPE particles mixed with the elastomeric material in an amount of between about 10 phr and about 24 phr.

In another form thereof, the invention provides a paper machine roll with a roll shell, an adhesive layer on the roll shell; and an outer layer for the roll. The outer layer includes a mixture of an elastomeric material and UHMWPE particles in an amount of between about 10 phr and about 24 phr.

In a further form thereof, the invention provides a method of covering a paper machine roll with steps of providing a roll shell; applying an adhesive layer to the roll shell; providing UHMWPE particles and an elastomeric material; mixing between about 10 phr and about 24 phr of the UHMWPE particles with the elastomeric material; and applying the mixture of UHMWPE particles and elastomeric material to the roll shell.

An advantage of the present invention is providing a paper machine roll cover that is resistant to harsh operating conditions of temperature, pressure and chemicals.

Another advantage of the present invention is providing a paper machine roll cover that can be ground to a high degree of smoothness, exhibits good sheet release properties and is resistant to marking.

A further advantage of the present invention is providing a paper machine roll cover that is less expensive to manufacture than comparable paper machine roll covers of other compositions.

BRIEF DESCRIPTION OF THE DRAWINGS

The above-mentioned and other features and advantages of this invention, and the manner of attaining them, will become more apparent and the invention will be better understood by reference to the following description of an embodiment of the invention, taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
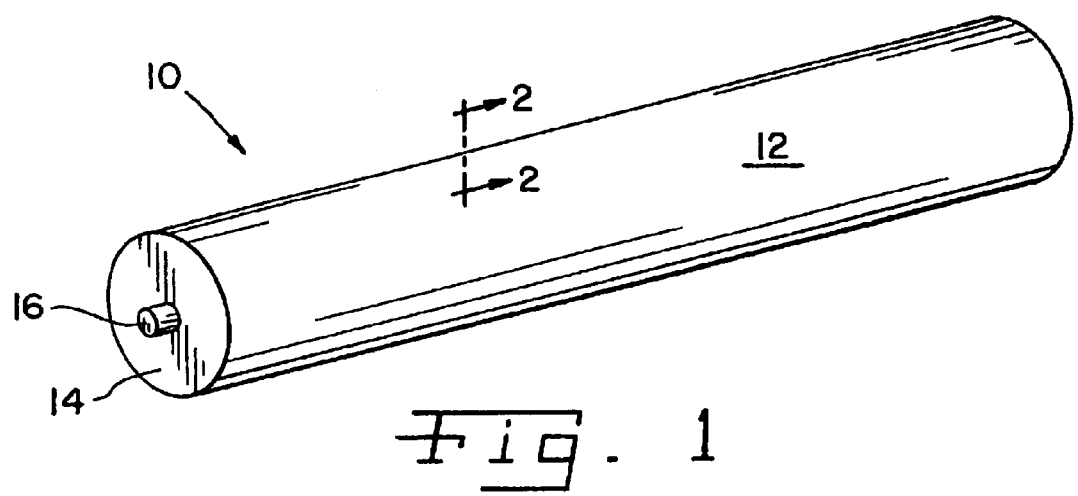
FIG. 1 is a perspective view of a paper machine roll having a cover according to the present invention.
Figure 2:
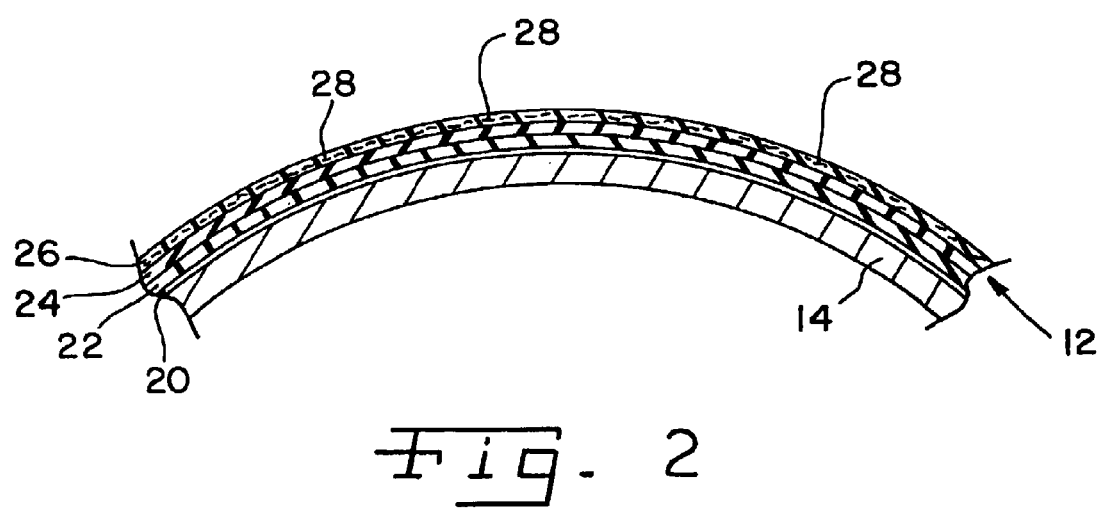
FIG. 2 is an enlarged, fragmentary cross-sectional view of the roll shown in FIG. 1, taken on line 2—2 of FIG. 1.

Referring now to the drawings, and more particularly to FIG. 1, there is shown a paper machine roll 10 that includes a roll cover 12 in accordance with the present invention. Cover 12 is provided on a roll shell or core 14.

In normal paper machine roll construction, core 14 is formed of steel or other metals and is substantially cylindrical and hollow. The length and width of core 12 will vary depending upon the paper machine in which the roll is to be installed, and the position in the paper machine in which the roll is to be used. Generally, core 14 extends the width of the paper machine, and may vary in diameter from less than a foot to six feet or more in diameter. Those skilled in the art will understand that core 14 will be provided with suitable stub shafts 16, through shafts, journals, bearings (not shown) and the like for mounting roll 10 in a paper machine. In that regard, roll 10 may be a controlled deflection roll including internal structures (not shown) for maintaining the desired straightness across the face of the roll. Frequently, roll 10 will be provided in a paper machine in nipped relationship to another roll or rolls. It also should be understood that the present invention is described for use in a paper machine, but also may have application and use in other industrial rolls. Paper machine rolls are a particularly advantageous use of the invention.

Cover 12 is a continuous rubber coating provided around the surface of core 14, and extends throughout the effective working face-length of roll 10. It known that the addition of Ultra High Molecular Weight Polyethylene (UHMWPE) particles into rubber compounds improves the abrasion resistance of the resulting rubber/elastomeric compound. As used herein in describing the present invention, and in the claims, references to UHMWPE, Ultra High Molecular Weight Polyethylene, particles shall be understood to mean polyethylene having an average molecular weight of greater than about one million g/mole, and preferably an average molecular weight of greater than about three million g/mole.

The addition of UHMWPE into rubber compounds affects the physical properties of the rubber compounds, resulting in improved resistance to abrasion and fracture. However, the amount of UHMWPE should be controlled, because UHMWPE particles are expensive to obtain, and increase the cost of the roll cover significantly. Known roll cover compounds using UHMWPE particles to improve abrasion resistance have included UHMWPE particles in amounts of 30 phr to 50 phr, or more. However, in accordance with the present invention, it has been discovered that substantially less UHMWPE can be used, while still achieving desirable improvements in abrasion resistance.

Tests were conducted to compare abrasion resistance of compounds having known concentrations of UHMWPE particles, and compounds having lower concentrations of UHMWPE, in accordance with the present invention. Samples from two different batches of each of the were made per accepted techniques. Each sample was made in the same configuration and size. Compounds tested included:

| Compound Materials | Compound 1 | Compound 2 | Compound 3 |
|---|---|---|---|
| NBR Polymer | 100.00 | 100.00 | 100.00 |
| Black/Mineral Mix | 63.25 | 63.25 | 63.25 |
| Saret 500DLC | 18.30 | 18.30 | 12.70 |
| Primax UH-1250 UHMWPE | 15.00 | 35.00 | 35.00 |
| Vul-Cup 40KE | 6.00 | 6.00 | 6.00 |

The test apparatus used was a TABER revolving-platform-double-head (RPDH) Abrader as defined in ASTM D 3389. The abrasion apparatus included a removable, flat, circular holder or platform to which abrader material was attached, and a pair of pivot arms to which samples (in the form of wheels) were attached. A motor rotated the circular platform, and a counter tallied the number of platform revolutions. The circular platform was rotated at 70+/−1 revolutions per minute, to provide a flat surface of abrader material traveling at a uniform angular velocity.

Two samples of each compound (in the form of wheels) were attached to the free ends of independently pivoted arms provided with 1000 grams auxiliary mass. The sample wheels were brought into peripheral surface engagement with the abrader material, so that, as the platform with abrader material thereon was rotated, the sample wheels were driven through the frictional engagement of the sample wheel periphery against the abrader material surface. The sample wheel peripheries and the abrader material traveled at acute angles, with one sample wheel rotated in one direction and the other sample wheel rotated in an opposite direction.

After standard conditioning of each sample, the starting weight, volume, thickness, diameter, hardness and density of each sample were measured and recorded. Each sample was run in the test equipment for the same number of cycles, following which the same physical characteristics of each were again measured. The change in volume for each sample, as a percentage of the starting volume, was reported as follows:

| | % Loss Compund 1 | % Loss Compund 2 | % Loss Compound 3 |
|---|---|---|---|
| Batch 1 | −2.11% | −2.92% | −2.25% |
| Batch 2 | −1.98% | −2.33% | −2.55% |

From the above, it can be seen that the abrasion resistance of the samples using 15 phr of UHMWPE particles exhibited abrasion resistance similar to the samples using 35 phr of UHMWPE particles.

Further, it has been found that modification of the surface of UHMWPE particles prior to the mixture thereof with the rubber compound improves physical properties of the resultant roll cover. Surface modified polyethylene is polyethylene processed so as to modify its surface to facilitate the incorporation of polymer particles by formation of polar functional groups such as hydroxil and carboxylate. These surface functionalities facilitate strong adhesion of the particles to the elastomeric matrix.

The incorporation into elastomers of surface modified UHMWPE particles results in roll covers with improved resistance to sliding abrasion.

Surface modified UHMWPE particles are commercially available. The desired surface modification of the UHMWPE particles can be achieved by at least two methods. In a reactive gas process controlled oxidation occurs. The reactive gas process is believed to modify the UHMWPE particle surfaces to a significant penetration depth. As a result of the free radical mechanism, cross-linking of the surface molecules on the particles occurs in concert with the treatment. The cross-linking locks the modified areas in place, making the treatment a permanent treatment to the UHMWPE particle surface.

In a second process, known as the plasma treatment process, plasma is used to ablate the surface of the molecules as modification occurs. The result is a shallower treated layer, and the treatment is sometimes seen as less permanent. For these reasons, the reactive gas process is preferred for treating UHMWPE particles in accordance with the present invention. Preferred UHMWPE particles for the present invention have a surface energy of about 55+ dynes/cm.

Depending on the function of the roll surface and the conditions under which the roll will operate, the composition of the matrix component of cover 12 can be varied. Load, speed, roll cover position and chemical environment can affect the bonding of cover 12 to metal core 14. Three basic methods have been used. In a first method, an adhesive layer 20 is applied to core 14, followed by a hard base layer 22, usually 80 Shore D or greater in hardness. An intermediate layer 24, which is softer than base layer 22 is applied thereover, followed by a top stock layer or surface layer 26. UHMWPE particles 28 in an amount of between about 10 phr and about 24 phr are added to top stock layer 26.

In a second method, a hard or semi-hard material, which may be the base layer 22 or intermediate layer 24 from the first mentioned method, is bonded directly on top of adhesive layer 20 or on core 14, followed by the top stock layer 26 having between about 10 phr and about 24 phr of UHMWPE particles 28 therein.

In a third method, the top stock layer 26 having between about 10 phr and about 24 phr of UHMWPE particles 28 therein is applied directly on top of core 14, perhaps with the use of adhesive layer 20 between the surface of core 14 and the top stock layer 26.

In the first, or three-layer method described above, where the base is harder than the intermediate layer, which is harder than the top stock layer, a gradual transition of stresses from the top stock layer to the metal through the two intermediate layers is provided. This type of construction is well known to those skilled in the art for high load and high-speed positions in the paper machine, as well as positions where there are concerns of chemicals affecting the bonding of the cover to the metal core. Hard rubber generally resists chemicals to a greater degree than soft rubber compounds. Therefore, providing one or more intermediate layers of harder rubber between the softer top stock layer 26 and roll core 14 provides greater cover life by reducing bond failure between cover 12 and the surface of core 14.

Those skilled in the art will understand readily what materials are suitable to be used in base layer 22 and intermediate layer 24 for the three-layer construction. Roll cover manufacturers have preferred formulations for base layer 22 and intermediate layer 24, which may vary from one manufacturer to another. Core 14 is prepared by cleaning and blasting with an abrasive grit, and may be primed with a suitable adhesive 20. A base layer 22 thickness of about 2 mm or more is applied by extrusion onto core 14 surface. Commonly, base layer 22 is between about 2 mm and about 6 mm thick, most commonly about 4 mm thick, although thinner or thicker layers can be used. An intermediate layer 24 of 2 mm or more is applied directly on top of base layer 22 by extrusion. Commonly, intermediate layer 24 is between about 2 mm and 4 mm thick, but can be thicker. The top stock layer 26 can be any of several compounds applied directly on top of intermediate layer 24, again by extrusion. The selection of elastomeric materials used in top stock layer 26 depends on the paper machine position and the operating conditions in which the roll is to be installed. Hardness and other physical properties can be varied. It should be noted that roll cover manufacturers each have their own preferred formulations for each of the layers 22, 24 and the matrix component of layer 26.

In the second method, wherein two layers are provided, a first (or bottom) layer at least about 2 mm thick is applied by extrusion directly on top of the previously cleaned and abrasive blasted, adhesive primed metal core 14. Commonly, the bottom layer in the two-layer method is between about 2 mm and about 6 mm thick, but can be thicker. Top stock layers 26 as those described above for the first method can be applied directly to the first applied layer in this method.

In the single-layer method, any of the top stocks described above are applied by extrusion directly on top of the previously cleaned, abrasive blasted, adhesive primed metal core surface.

Application of layers 22, 24 and 26 has been described thus far herein as by extrusion; however, those skilled in the art will understand that extrusion is merely one of the acceptable application techniques, and other application techniques also can be used. For example, it is known to prepare pre-calendered sheets of elastomer or elastomer and filler mixtures, and hand lay the sheets on the roll. Techniques such as this can be used also in practicing the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A surface layer for a roll cover on a roll of a paper machine manufacturing a paper web, said web having a width, said surface layer comprising:

an elastomeric material; and

UHMWPE particles mixed with said elastomeric material in an amount of between about 10 phr and about 24 phr;

said surface layer having a working face length on said roll at least as long as said web width manufactured on the paper machine.

2. The surface layer of claim 1, said UHMWPE particles comprising between about 15 phr and about 20 phr.

3. The surface layer of claim 1, said UHMWPE particles comprising between about 15 phr and about 24 phr.

4. The surface layer of claim 1, said UHMWPE particles comprising between about 10 phr and about 20 phr.

5. The surface layer of claim 1, said UHMWPE particles being surface modified.

6. The surface layer of claim 5, said surface modified UHMWPE particles being modified by plasma ablation.

7. The surface layer of claim 5, said surface modified UHMWPE being modified by a reactive gas treatment.

8. The surface layer of claim 5, said surface modified UHMWPE being modified by the formation of polar functional groups.

9. The surface layer of claim 1, said UHMWPE particles having an average molecular weight greater than about one million g/mole.

10. The surface layer of claim 1, said surface modified UHMWPE particles having an average molecular weight greater than about three million g/mole.

11. The surface layer of claim 10, said UHMWPE particles comprising between about 15 phr and about 20 phr.

12. The surface layer of claim 11, said surface modified UHMWPE particles being modified by plasma ablation.

13. The surface layer of claim 11, said surface modified UHMWPE being modified by a reactive gas treatment.

14. A roll for a paper machine manufacturing a paper web having a width comprising:

a roll shell having an effective working face-length at least as wide as the paper machine manufacturing width;

an adhesive layer on said roll shell; and an outer layer for said roll, said outer layer comprising a mixture of an elastomeric material and UHMWPE particles, said particles provided in an amount of between about 10 phr and about 24 phr, said outer layer being a continuous coating on the shell surface throughout said effective working face-length.

15. The paper machine roll of claim 14, said UHMWPE particles having an average molecular weight greater than about three million g/mole.

16. The paper machine roll of claim 14, said mixture including between about 10 phr and about 20 phr UHMWPE particles.

17. The paper machine roll of claim 14, said mixture including between about 15 phr and about 24 phr UHMWPE particles.

18. The paper machine roll of claim 14, said mixture including between about 15 phr and about 20 phr UHMWPE particles.

19. The paper machine roll of claim 16, said surface UHMWPE particles being surface modified.

20. A method of covering a roll for a paper machine having a manufacturing width for manufacturing a paper web, said method comprising steps of:

providing a roll shell with an effective working face-length at least as wide as the manufacturing width;

applying an adhesive layer to the roll shell throughout the effective working face length;

providing UHMWPE particles and an elastomeric material;

mixing between about 10 phr and about 24 phr of the UHMWPE particles with the elastomeric material; and applying the mixture of UHMWPE particles and elastomeric material to the roll shell throughout the effective working face-length.

21. The method of claim 20, including a step of modifying the surfaces of the UHMWPE particles.

22. The method of claim 20, said step of modifying the surfaces of the UHMWPE particles performed by one of reactive gas treatment and plasma ablation.

23. The method of claim 20, said step of providing UHMWPE particles including providing UHMWPE particles having an average molecular weight greater than about three million g/mole.

24. The method of claim 20, including applying a base layer on the adhesive layer, and applying the mixture of UHMWPE particles and elastomeric material on the base layer.

25. The method of claim 20, including applying a base layer on the adhesive layer, applying an intermediate layer on the base layer, and applying the mixture of UHMWPE particles and elastomeric material on the base layer.

* * * * *